(12) United States Patent
Lim et al.

(10) Patent No.: US 9,036,583 B2
(45) Date of Patent: May 19, 2015

(54) TRANSMISSION METHOD AND APPARATUS FOR CARRIER AGGREGATION AND UPLINK MIMO

(75) Inventors: Suhwan Lim, Anyang (KR); Manyoung Jung, Anyang (KR); Yoonoh Yang, Anyang (KR); Sangwook Lee, Anyang (KR)

(73) Assignee: LG ELECTRONICS INC., Seoul (KR)

( * ) Notice: Subject to any disclaimer, the term of this patent is extended or adjusted under 35 U.S.C. 154(b) by 155 days.

(21) Appl. No.: 13/809,376

(22) PCT Filed: Jul. 6, 2011

(86) PCT No.: PCT/KR2011/004933
§ 371 (c)(1),
(2), (4) Date: Jan. 9, 2013

(87) PCT Pub. No.: WO2012/008705
PCT Pub. Date: Jan. 19, 2012

(65) Prior Publication Data
US 2013/0114578 A1  May 9, 2013

Related U.S. Application Data

(60) Provisional application No. 61/364,806, filed on Jul. 16, 2010.

(51) Int. Cl.
H04W 4/00 (2009.01)
H04B 7/04 (2006.01)
H04B 7/02 (2006.01)
H04B 7/06 (2006.01)

(52) U.S. Cl.
CPC .............. *H04B 7/0413* (2013.01); *H04B 7/022* (2013.01); *H04B 7/0404* (2013.01); *H04B 7/0613* (2013.01)

(58) Field of Classification Search
CPC ...... H04B 7/04; H04B 7/0669; H04B 7/0602; H04B 7/024; H04W 72/0446; H04W 84/12; H04W 84/18; H04W 72/04; H04W 88/08; H04W 72/14; H04W 80/04; H04W 52/40
USPC .............. 370/328, 329, 334, 336; 455/59, 60, 455/101, 103
See application file for complete search history.

(56) References Cited

U.S. PATENT DOCUMENTS

| | | | |
|---|---|---|---|
| 7,043,273 B2 * | 5/2006 | Sarresh et al. | 455/562.1 |
| 7,920,516 B2 * | 4/2011 | Nishio et al. | 370/328 |
| 8,046,029 B2 * | 10/2011 | Teo et al. | 455/562.1 |
| 8,305,986 B2 * | 11/2012 | Zhang et al. | 370/329 |
| 8,355,424 B2 * | 1/2013 | Xi et al. | 375/144 |
| 8,385,453 B2 * | 2/2013 | Li et al. | 375/267 |
| 8,391,875 B1 * | 3/2013 | Satapathy et al. | 455/446 |

(Continued)

*Primary Examiner* — Brian O'Connor
(74) *Attorney, Agent, or Firm* — Birch, Stewart, Kolasch & Birch, LLP

(57) ABSTRACT

A transmission method for carrier aggregation, more particularly, for uplink MIMO and carrier aggregation, in a method for transmitting an uplink signal by the carrier aggregation in a terminal having at least four antennas, includes receiving a grant signal for transmission of the uplink signal, the grant signal including information related to use of a primary cell and a secondary cell, determining one antenna or at least two antennas to use the primary cell, determining one antenna or at least two antennas to use the secondary cell, and transmitting a first uplink signal to the primary cell and a second uplink signal to the secondary cell using the respective determined antennas.

4 Claims, 6 Drawing Sheets

(56) References Cited

U.S. PATENT DOCUMENTS

| | | | |
|---|---|---|---|
| 8,422,426 B2* | 4/2013 | Ko et al. | 370/328 |
| 8,483,156 B2* | 7/2013 | Toskala et al. | 370/329 |
| 8,576,791 B2* | 11/2013 | Luo | 370/329 |
| 8,705,461 B2* | 4/2014 | Bala et al. | 370/329 |
| 8,730,922 B2* | 5/2014 | Hultell et al. | 370/334 |
| 8,737,252 B2* | 5/2014 | Davis | 370/252 |
| 8,737,307 B2* | 5/2014 | Kim et al. | 370/328 |
| 8,843,074 B2* | 9/2014 | Ishii | 455/67.11 |
| 8,855,089 B2* | 10/2014 | Lastinger et al. | 370/338 |
| 2009/0052514 A1 | 2/2009 | Sampath | |
| 2009/0257390 A1* | 10/2009 | Ji et al. | 370/329 |
| 2010/0130218 A1 | 5/2010 | Zhang et al. | |
| 2011/0034175 A1* | 2/2011 | Fong et al. | 455/450 |
| 2011/0096815 A1 | 4/2011 | Shin et al. | |
| 2011/0176593 A1* | 7/2011 | Hultell et al. | 375/224 |
| 2011/0249648 A1* | 10/2011 | Jen | 370/330 |
| 2012/0275411 A1* | 11/2012 | Kim et al. | 370/329 |

* cited by examiner

TRANSMISSION METHOD AND APPARATUS FOR CARRIER AGGREGATION AND UPLINK MIMO

This application is the National Phase of PCT/KR2011/004933 filed on Jul. 6, 2011, which claims priority under 35 U.S.C. 119(e) to the U.S. Provisional Application No. 61/364,806 filed on Jul. 16, 2010, all which are hereby expressly incorporated by reference into the present application.

TECHNICAL FIELD

The present disclosure relates to transmission for carrier aggregation, and more particularly, a transmission method and apparatus for multi-antenna based carrier aggregation.

BACKGROUND ART

MIMO is a short term of Multi Input and Multi Output, and indicates an method for improving data transmission and reception efficiency by adapting a multiple transmit antenna and a multiple receive antenna, breaking with an method using one transmit antenna and one receive antenna. That is, the MIMO technology is to implement capacity increase and performance improvement by using multiple antennas at a transmitting end (transmitter) or a receiving end (receiver) in a wireless communication system. Here, MIMO is also referred to a multiple antenna (multi-antenna).

Summarizing the aforementioned, a multi-antenna technology adapts a technology of aggregating data segments received via various antennas, without being dependent on a single antenna route, in order to receive one entire message. The multi-antenna technology can improve data rate within a specific range or increase a system range for a specific data rate, accordingly, it is an attractive next generation mobile communication technology, which can be broadly used for mobile communication terminals, relays and the like, namely, expected to overcome throughput limit of mobile communications, which has reached the limitation due to data communication extension or the like.

In general, when a transport channel experiences deep fading, if a different version or a replica of a transmitted signal is not additionally transmitted, it is difficult for a receiver to determine the transmitted signal. A resource corresponding to the different version or the replica is referred to as diversity, and is one of the most important factors that contribute to reliable transmission over a wireless channel.

The use of the diversity can maximize data transfer capacity or data transfer reliability. A system for implementing the diversity by using multiple Tx antennas and multiple Rx antennas is referred to as a MIMO system or a multiple antenna system.

A multiple antenna scheme includes space frequency block coding (SFBC), space time block coding (STBC), cyclic delay diversity (CDD), frequency switched transmit diversity (FSTD), time switched transmit diversity (TSTD), precoding vector switching (PVS), spatial multiplexing (SM), generalized cyclic delay diversity (GCDD), selective virtual antenna permutation (S-VAP), etc. Such a MIMO scheme may also be considered as a measure for improving a data rate and reliability in a communication system having a multiple cell structure.

LTE-Advanced (LTE-A) system, which is one of systems following three generation wireless communication systems, is undergoing a standardization work for a terminal, which can support not only the MIMO system but also a Carrier Aggregation (CA), which is a scheme for transmitting more data to a terminal or User Equipment (UE) using different multiple carriers. The LTE-A is a technology for aggregating a plurality of unit carriers, which are used in the conventional LTE release-8/9, to be used simultaneously. Such technology aims to extending a bandwidth up to 100 MHz.

In other words, a carrier, which was defined fully up to 20 MHz in the conventional LTE release-8/9, is redefined as a component carrier, and one terminal is allowed to use maximum 5 component carriers by the carrier aggregation (CA) technology. Hereinafter, a terminal is referred to as User Equipment (UE).

The CA is a way to get high throughput by aggregating a used band for each component carrier. There are three types of carrier aggregations which are intra-band contiguous aggregation, intra-band non-contiguous aggregation and inter-band non-contiguous aggregation for LTE-Advanced CA.

Consequently, in wireless communication systems, such as the LTE-Advanced system, following the three generation system, it is very important to provide a UE's radio frequency (RF) architecture for supporting a combination of CA and MIMO system. However, such UE RF architecture has not been effectively provided yet.

DISCLOSURE OF INVENTION

Solution to Problem

Therefore, an aspect of the detailed description is to provide an apparatus and method having UE RF architecture, capable of effectively supporting a combination system of Carrier Aggregation (CA) and an uplink MIMO in a wireless communication system.

To achieve these and other advantages and in accordance with the purpose of the present invention, as embodied and broadly described herein, there is provided a transmission method for uplink Multi-Input Multi-Output (MIMO) and Carrier Aggregation (CA), in a method for transmitting an uplink signal by CA in a terminal having at least four antennas, the method including receiving a grant signal for transmission of an uplink signal, the grant signal including information related to use of a primary cell and a secondary cell, determining one antenna or at least two antennas to use the primary cell, determining one antenna or at least two antennas to use the secondary cell, and transmitting a first uplink signal to the primary cell and a second uplink signal to the secondary cell using the respective determined antennas.

The antenna to use the primary cell may not overlap the antenna to use the secondary cell. When at least two antennas are to use the primary cell, the at least two antennas may not be adjacent to each other. When two antennas are to use the secondary cell, the at least two antennas may not be adjacent to each other.

The transmission of the first uplink signal to the primary cell and the second uplink signal to the secondary cell using the respective determined antennas may be an inter-band or intra-band transmission.

In accordance with another aspect of the detailed description, there is provided a transmission method for uplink Multi-Input Multi-Output (MIMO) and Carrier Aggregation (CA), in a method for transmitting an uplink signal by CA in a terminal having at least four antennas, the method including receiving a grant signal for transmission of the uplink signal, the grant signal including information related to use of a primary cell and a secondary cell, determining at least four antennas to use the primary cell at a frame or sub-frame time interval, determining at least two antennas to use the secondary cell at a frame or sub-frame time interval, and transmitting a first uplink signal to the primary cell and a second uplink signal to the secondary cell using the respective determined antennas.

A time to use the primary cell and a time to use the secondary cell may not overlap each other, and when at least two antennas are to use the secondary cell, the at least two antennas may not be adjacent to each other.

The transmission of the first uplink signal to the primary cell and the second uplink signal to the secondary cell using the respective determined antennas may be an inter-band or intra-band transmission. The sub-frame or frame time interval may be in the range of 1 ms (millisecond) to 10 ms (millisecond).

Advantageous Effects of Invention

In accordance with the transmission method for uplink MIMO and carrier aggregation, an efficient connection structure between the carrier aggregation and the uplink MIMO may be proposed, which derives an effect of maximizing bandwidth expansion in the wireless communication system.

MODE FOR THE INVENTION

Figure 1:
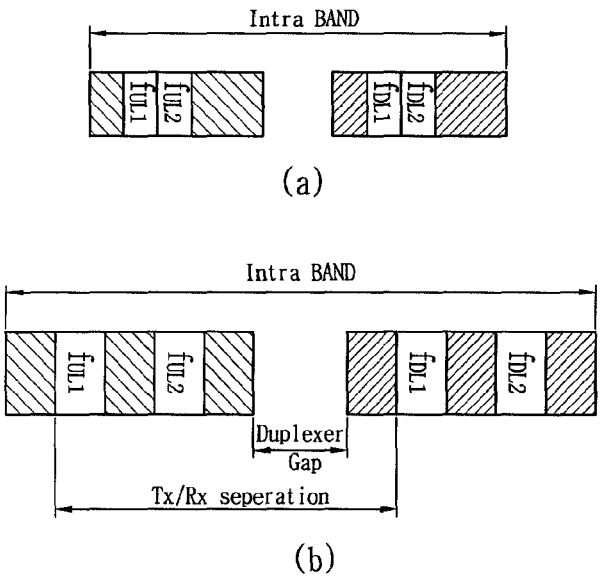
FIG. 1 is an overview of an intra-band Carrier aggregation (CA) in accordance with the related art.

Reference will now be made in detail to the preferred embodiments of the present invention, examples of which are illustrated in the accompanying drawings. It will also be apparent to those skilled in the art that various modifications and variations can be made in the present disclosure without departing from the spirit or scope of the invention. Thus, it is intended that the present disclosure cover modifications and variations of this invention provided they come within the scope of the appended claims and their equivalents.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. Term 'and/or' may represent a combination of a plurality of related disclosed items or any of the plurality of related disclosed items.

It will be understood that when an element is referred to as being "connected with" another element, the element can be directly connected with the other element or intervening elements may also be present. In contrast, when an element is referred to as being "directly connected with" another element, there are no intervening elements present.

Technical terms used in this specification are used to merely illustrate specific embodiments, and should be understood that they are not intended to limit the present disclosure. A singular representation may include a plural representation as far as it represents a definitely different meaning from the context. Terms 'include' or 'has' used herein should be understood that they are intended to indicate an existence of features, numbers, steps, operations or components or a combination thereof, disclosed in the specification, and it may also be understood that an existence of other features, numbers, steps, operations or components or a combination thereof or probability of addition thereof should not be excluded in advance.

As far as not being defined differently, all terms used herein including technical or scientific terms may have the same meaning as those generally understood by an ordinary person skilled in the art to which the present disclosure belongs, and should not be construed in an excessively comprehensive meaning or an excessively restricted meaning.

Embodiments of the present disclosure will be described below in detail with reference to the accompanying drawings where those components are rendered the same reference number that are the same or are in correspondence, regardless of the figure number, and redundant explanations are omitted.

Hereinafter, description will be given of several terms used for explaining the exemplary embodiments.

Primary and Secondary Component Carriers in LTE-A System

Unlike the conventional LTE using one component carrier, a method for effectively managing component carriers is more required in the carrier aggregation (CA) using a plurality of carriers. For effective management of the component carriers, the component carriers may be classified, according to functions and characteristics, into a primary component carrier and a secondary component carrier.

The primary carrier, which is a core of management upon using plural component carriers, is defined by one for each UE. Other component carriers except for the one primary carrier are defined as secondary component carriers.

Detailed roles and functions of the primary carrier and the secondary carrier are being discussed, but in general, the primary carrier serves as a core carrier for managing the entire aggregated component carriers, and the other secondary carriers may have high probability to provide additional frequency resources for ensuring higher data rate. For example, a radio resource control connection for signaling with a UE may be carried out by the primary carrier.

The primary component carrier also plays an essential role with regard to security and upper layer information. When one component carrier is actually present, the corresponding component carrier may be the primary carrier.

Primary and Secondary Cells in LTE-A System

A cell indicates a combination (set) of downlink resources and optionally uplink resources. A linking between the carrier frequency of the downlink resources and the carrier frequency of the uplink resources is indicated in system information transmitted on downlink resources.

The primary cell (Pcell) may operate on a primary frequency or primary component carrier, in which the UE either performs the initial connection establishment procedure or initiates the connection re-establishment procedure, or the cell indicated as the primary cell in the handover procedure. The secondary cell (Scell) may operate on a secondary frequency or a secondary component carrier, which may be configured once Radio Resource Control (RRC) connection is established, and may be useable to provide additional radio resources.

FIG. 1 is an overview of an intra-band Carrier aggregation (CA) in accordance with the related art.

FIG. 1A illustrates an intra-band contiguous CA, and FIG. 1B illustrates an intraband non-contiguous CA. Here, $f_{UL1}$ and $f_{DL1}$ indicate an uplink carrier frequency and a downlink carrier frequency of the first component carrier, respectively, and $f_{UL2}$ and $f_{DL2}$ indicate an uplink carrier frequency and a downlink carrier frequency of the second component carrier, respectively.

An LTE-Advanced (LTE-A) adapts various schemes including uplink MIMO and CA to implement high-speed radio transmission. The CA discussed in the LTE-A may be divided into the intra-band contiguous CA illustrated in FIG. 1A, and the intra-band non-contiguous CA illustrated in FIG. 1B.

Figure 2:
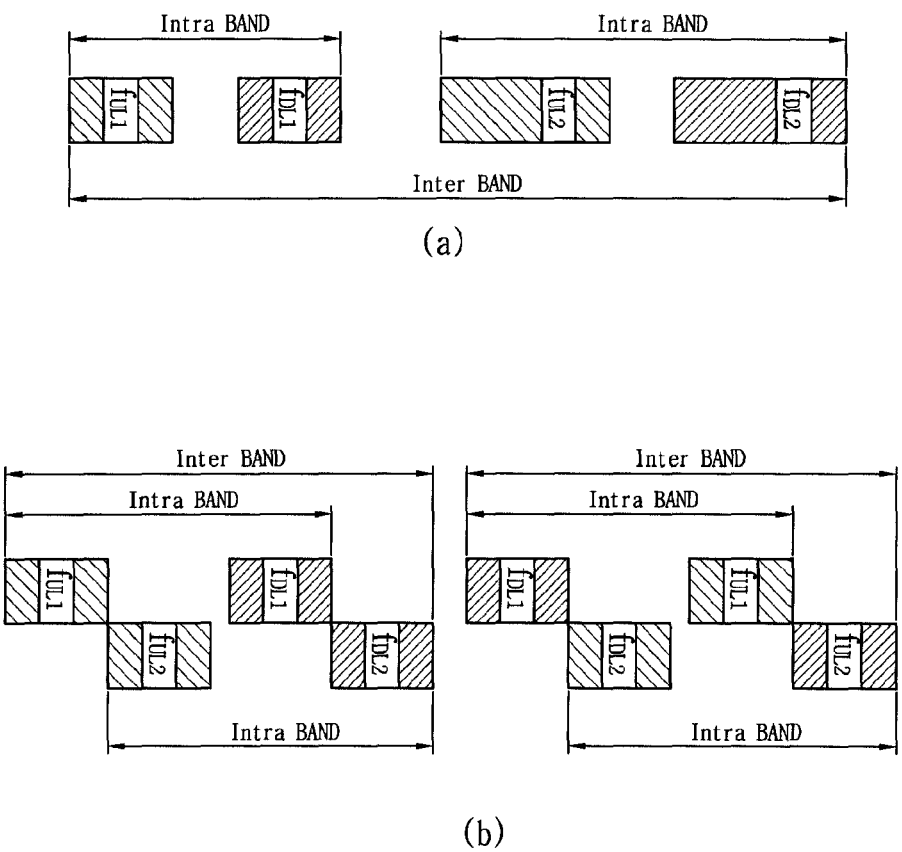
FIG. 2 is an overview of an inter-band CA in accordance with the related art.

FIG. 2 is an overview of an inter-band CA in accordance with the related art. FIG. 2A illustrates a combination of a low band and a high band for the inter-band CA, and FIG. 2B illustrates a combination of similar frequency bands for the inter-band CA.

That is, the inter-band CA of FIG. 2 may be divided into an inter-band CA among low-band carriers and high-band carriers, which have different Radio Frequency (RF) characteristics, as illustrated in FIG. 2A, and an inter-band CA of similar frequencies, which have similar RF characteristics and thus can use a common RF terminal for each component carrier, as illustrated in FIG. 2B.

In FIG. 2B, the left side shows the non-contiguous carrier aggregation in Band 18 and Band 19 in the following Table 1, and the right side shows the switching UL/DL transmission band in Band 13 and Band 14.

TABLE 1

| E-UTRA Operating Band | Uplink (UL) operating band BS receive UE transmit FUL_low-FUL_high | Downlink (DL) operating band BS transmit UE receive FDL_low-FDL_high | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[Note 1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 Hz | 1844.9 MHz-1879.9 Hz | FDD |

TABLE 1-continued

| E-UTRA Operating Band | Uplink (UL) operating band BS receive UE transmit FUL_low-FUL_high | Downlink (DL) operating band BS transmit UE receive FDL_low-FDL_high | Duplex Mode |
|---|---|---|---|
| 10 | 1710 MHz-1770 MHz | 2110 MHz-2170 MHz | FDD |
| 11 | 1427.9 MHz-1447.9 Hz | 1475.9 MHz-1495.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz 862 MHz | 791 MHz 821 MHz | FDD |
| 21 | 1447.9 MHz 1462.9 Hz | 1495.9 MHz 1510.9 Hz | FDD |
| 22 | [3410] MHz [3500] Hz | [3510] MHz [3600] MHz | FDD |
| ... | | | |

Note [1] Band 6 is not applicable.

Figure 3:
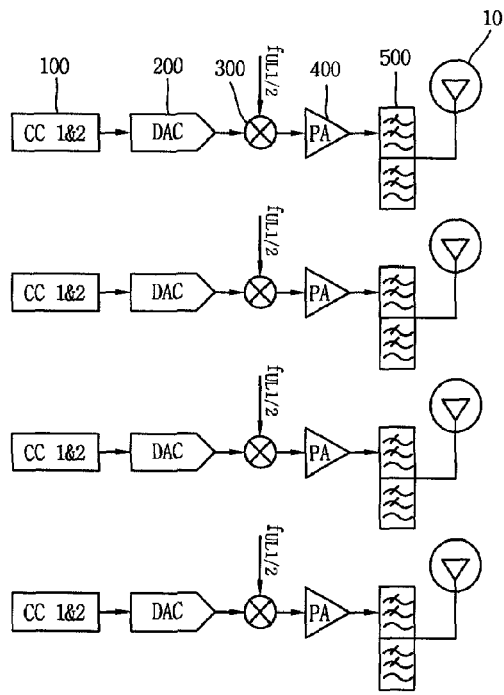
FIG. 3 is a block diagram illustrating a general UE transmitter (Tx) architecture for uplink (UL)-MIMO and CA of a multiple antenna in accordance with the related art.

FIG. 3 is a block diagram illustrating a general UE transmitter architecture for combination of uplink (UL) MIMO and CA of a multiple antenna in accordance with the related art.

The general UE transmitter architecture illustrated in FIG. 3 may include a component carrier (CC) information bit part 100, a digital-to-analog converter (DAC) 200, an uplink frequency converter 300, a power amplifier (PA) 400, a duplexer 500, an antenna 10 and the like. FIG. 3 illustrates a general UE transmitter architecture for the combination of UL-MIMO and CA (i.e., inter-band non-contiguous CA and intraband non-contiguous CA) to support an UL MIMO transmission mode for Rel-10 LTE-A system.

If it is assumed that the number of transmitter (Tx) antennas for UL-MIMO is 4 and a UE power class is 3, it indicates that the UE's maximum output power is 23 dBm for total transmission bandwidth as defined in TS36.101. Here, UE's total transmit power per each component carrier should be less than UE maximum output power (23 dBm in power class 3).

Each UE architecture illustrated in FIGS. 4 to 7 may include component carrier information bit parts 110, 120 (FIGS. 4 and 5), a DAC 200, an uplink frequency converter 300, a PA 400, a duplexer 500, a diplexer 600, a low pass filter (LPF) 700, a low noise amplifier (LNA) 800, a downlink frequency converter 310, an analog-to-digital converter (ADC) 900, antennas 10, 20, 30 and 40, and the like.

Here, the duplexer 500 may be used for division between transmitter (UL of UE) and a receiver (DL of UE) of two bands, and the diplexer 900 may be used for division between a component carrier 1 (CC1) 110 and a component carrier 2 (CC2) 120 in an inter-band.

Figure 4:
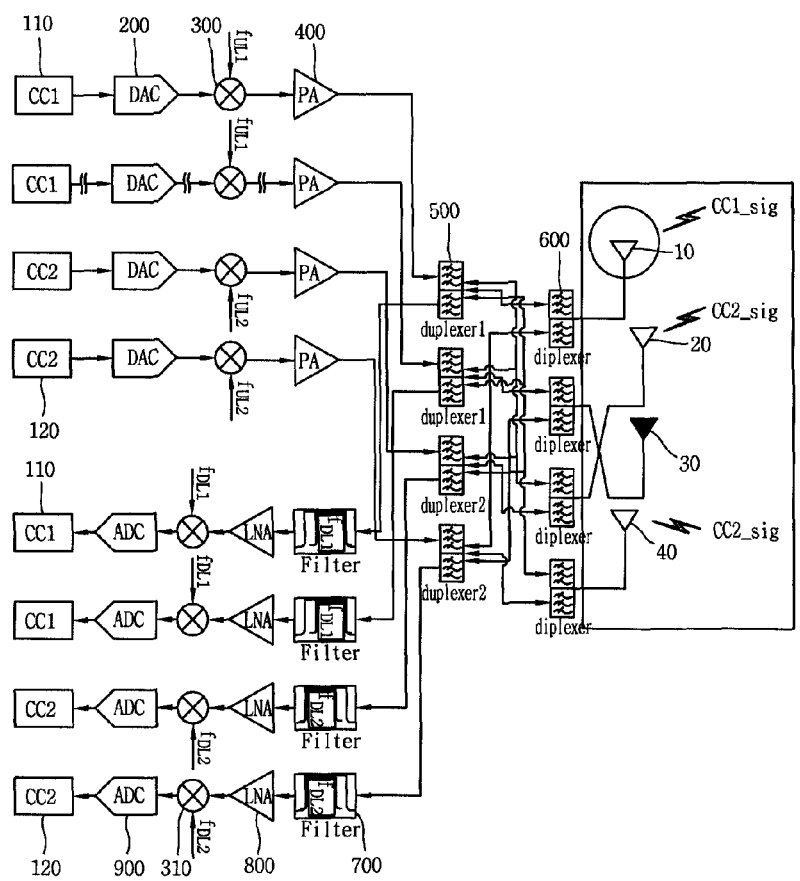
FIG. 4 is an exemplary view illustrating an operation when using one or two transmit (Tx) antennas for each component carrier in a UE architecture adapting an effective transmission method proposed for intra/inter-band CA in accordance with one exemplary embodiment.

FIG. 4 is an exemplary view illustrating an operation when using one or two transmit antennas for each component carrier in a UE architecture adapting an effective transmission method proposed for intra/inter-band CA in accordance with one exemplary embodiment.

If antennas are designed to be configured in a narrow spacing, the antenna separation distance should be enlarged to minimize the spatial correlation between signals of respective component carriers (for example, CC1 and CC2 or a primary cell and a secondary cell). In this specification, as illustrated in FIG. 4, in order to maximize the antenna separation distance for each component carrier (for example, CC1 and CC2 or primary cell and secondary cell), UE signal from the CC1 110 is transmitted by the first antenna 10 or the third antenna 30 for UL-MIMO, and UE signal from the CC2 120 is transmitted by the second antenna 20 and the fourth antenna 40 for the UL-MIMO.

In general, UE UL transmission mode is defined from channel quality of each component carrier, and then a UL antenna configuration for each component carrier is determined (settled) by UL scheduling grant. If CC1 110 is configured with Rel-8 compatible transmission (using one transmit antenna) and CC2 120 is configured with spatial multiplexing for uplink or two transmit antenna diversity mode, the CC1 110 may be configured with the first antenna 10 and the CC2 120 may be configured with the second antenna 20 and the fourth antenna 40, as illustrated in FIG. 4, for minimizing the spatial correlation between the component carriers.

Here, the total maximum output power of the first to fourth antennas 10, 20, 30, 40 is less than or equal to 23 dBm in power class 3. So, the total output power of each component carrier for UL-MIMO transmission is less than or equal to 20 dBm.

Figure 5:
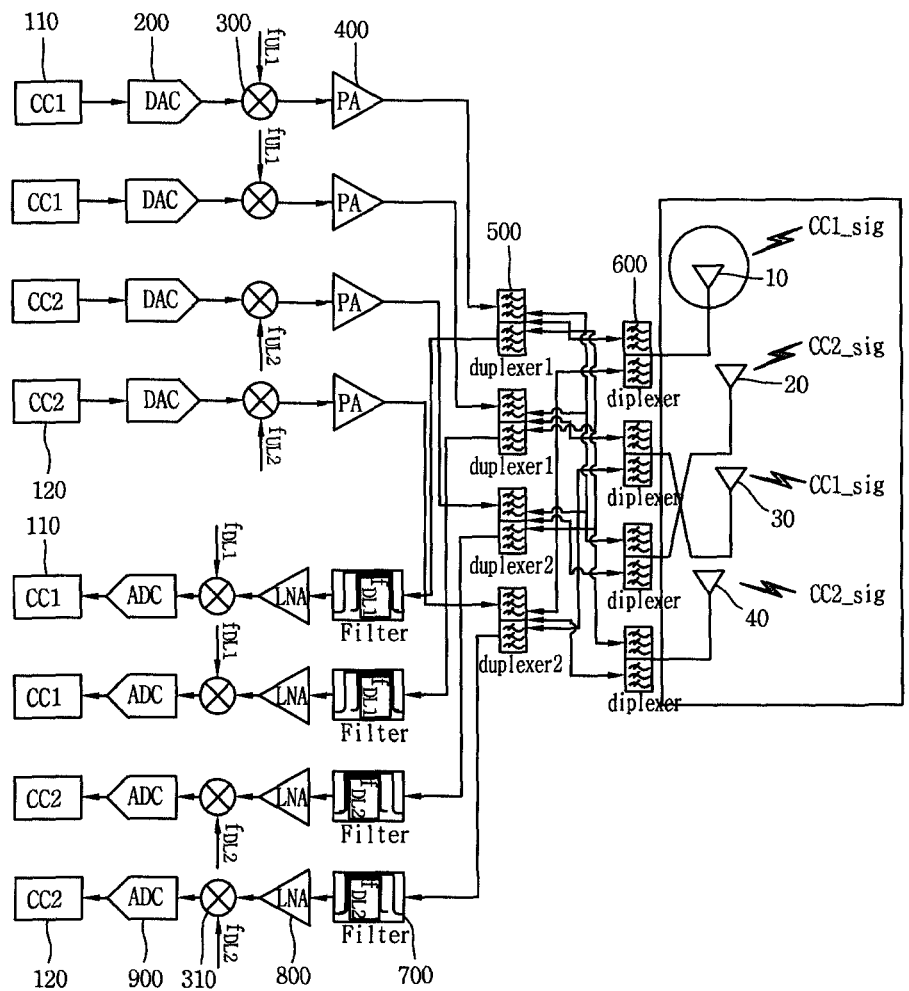
FIG. 5 is an exemplary view illustrating an operation when using two transmit (Tx) antennas for each component carrier in a UE architecture adapting an effective transmission method proposed for intra/inter-band CA in accordance with one exemplary embodiment.

FIG. 5 is an exemplary view illustrating an operation when using two transmit antennas for each component carrier in a UE architecture adapting an effective transmission method proposed for intra/inter-band CA in accordance with one exemplary embodiment.

In the case of FIG. 5, each component carrier (for example, CC1 and CC2 or a primary carrier and a secondary carrier) may be configured with two transmit (Tx) antenna diversity mode or a spatial multiplexing for UL-MIMO. Also, to minimize the spatial correlation between component carrier signals, the CC1 110 may be configured with the first and third antennas 10 and 30, and the CC2 120 may be configured with the second and fourth antennas 20 and 40.

Here, the summed maximum output power of the first antenna 10 and the third antenna 30 for the CC1 110 is less than or equal to 20 dBm, and also the summed maximum output power of the second antenna 20 and the fourth antenna 40 for the CC2 120 is less than or equal to 20 dBm.

Figure 6:
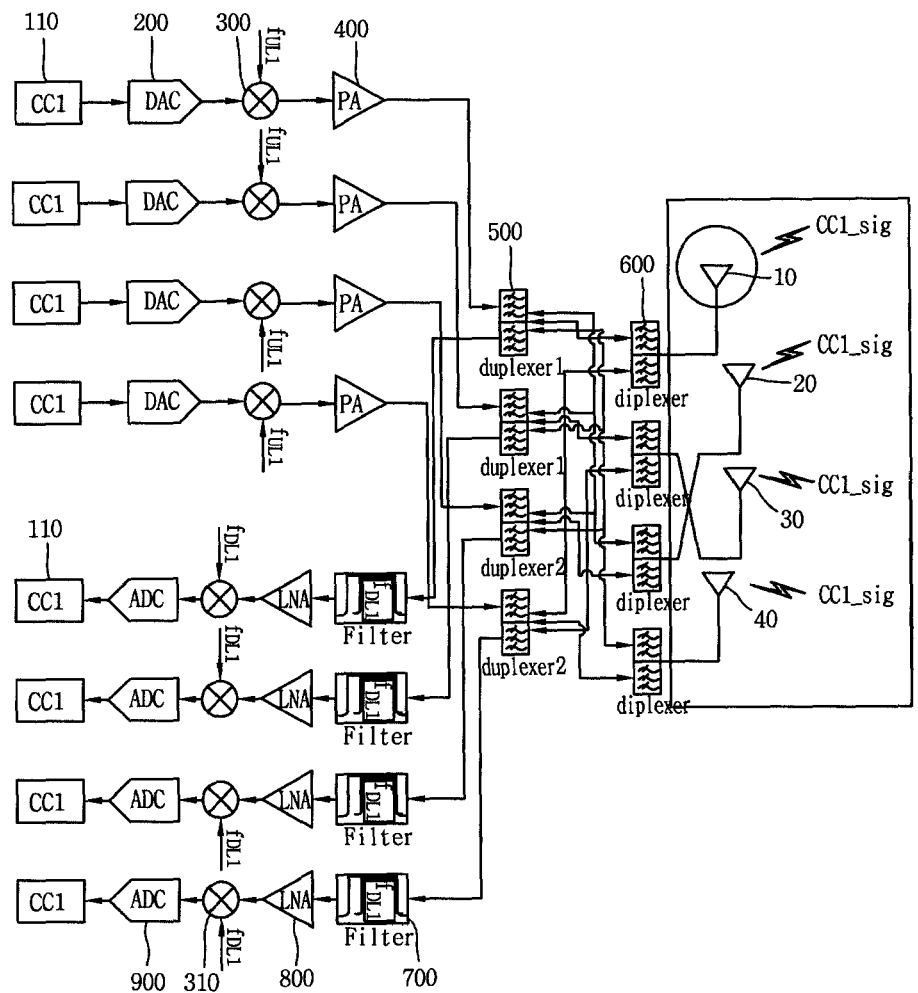
FIG. 6 is an exemplary view illustrating an operation when using four transmit (Tx) antennas for each component carrier in a UE architecture adapting an effective transmission method proposed for intra/inter-band CA in accordance with one exemplary embodiment.

FIG. 6 is an exemplary view illustrating an operation when using four transmit antennas for each component carrier (for example, CC1 and CC2 or a primary carrier and a secondary carrier) in a UE architecture adapting an effective transmission method proposed for intra/inter-band CA in accordance with one exemplary embodiment.

In FIG. 6, all UE transmit (Tx) antennas are used for UL-MIMO in one component carrier. Here, the maximum output power of each antenna is less than or equal to 17 dBm.

Referring to FIGS. 4 and 5, each antenna may be mapped to each component carrier even when the separation bandwidth of each component carrier is more than 100 MHz. In other words, if the operating range of one PA 400 and one duplexer 500 can support the current component carrier combination as illustrated in FIGS. 1A, 1B and FIG. 2B, the same PA 400 and duplexer 500 may be used, and in this case, the diplexer 600 is not needed.

If the operating range of one PA 400 and one duplexer 500 cannot support the current component carrier combination as illustrated in FIG. 2A, other PA, duplexer and diplexer may be used as illustrated in FIGS. 4 to 6.

Figure 7:
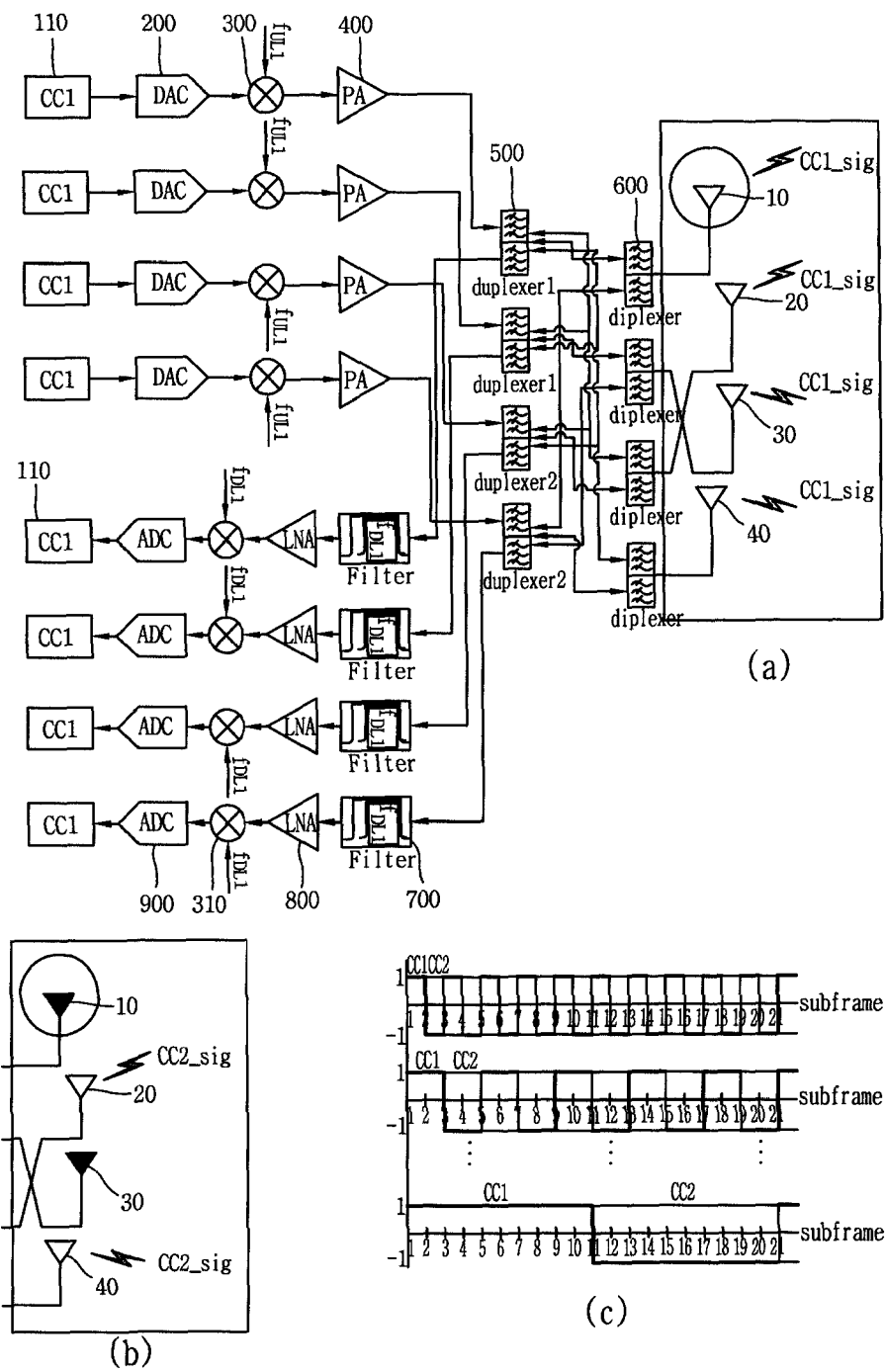
FIG. 7 is an exemplary view illustrating a transmission method when using four transmit (Tx) antennas and two transmit antennas for component carriers, respectively, in a UE architecture adapting an effective transmission method proposed for intra/inter-band CA in accordance with one exemplary embodiment.

FIG. 7 is an exemplary view illustrating a transmission method when using four transmit antennas and two transmit antennas for respective component carrier in a UE architecture adapting an effective transmission method proposed for intra/inter-band CA in accordance with one exemplary embodiment.

As illustrated in FIG. 6, the UE can transmit information data related to a single component carrier in an instant time. That is, as illustrated in FIG. 7A, a multiple component carrier transmission is not applicable when the UE receives UL scheduling grant for four Tx transmission mode for the CC1 110.

Therefore, the UE architecture and the effective transmission method proposed in FIG. 7, can be extended to support the combination of UL-MIMO and intra-band CA for LTE-A system with switching each component carrier per sub-frame or frame unit.

For example, if the CC1 110 is configured with four Tx diversity mode or a spatial multiplexing for UL-MIMO as illustrated in FIG. 7A and the CC2 120 is configured with the first antenna 10, the second antenna 20 or the third antenna 30 for UL transmission, the proposed UE architecture and effective transmission method can be available to make the component carrier configured with the antenna by switching each component carrier according to the frame or sub-frame as illustrated in FIG. 7C.

The transmission method may be applicable to a general UE architecture having an individual RF chain for each component carrier. In this UE structure, the CC1 110 may be configured with four Tx antennas for UL-MIMO transmission at the first frame, and transmission of the CC1 110 is off in the beginning of the second sub frame. The CC2 120 is on at the second sub frame and configured with two Tx antennas for UL-MIMO transmission as illustrated in FIG. 7.

In general, a power transient time between one RF chain and another RF chain is assumed at 17 us~1 ms. In the proposed transmission method for the CA and the UL-MIMO system, the flexible switching time according to a sub frame or frame unit is longer than the transit time, so the transmission method can be applicable with the flexible switching time according to the sub-frame (1 ms) or frame (10 ms) unit.

Figure 8:
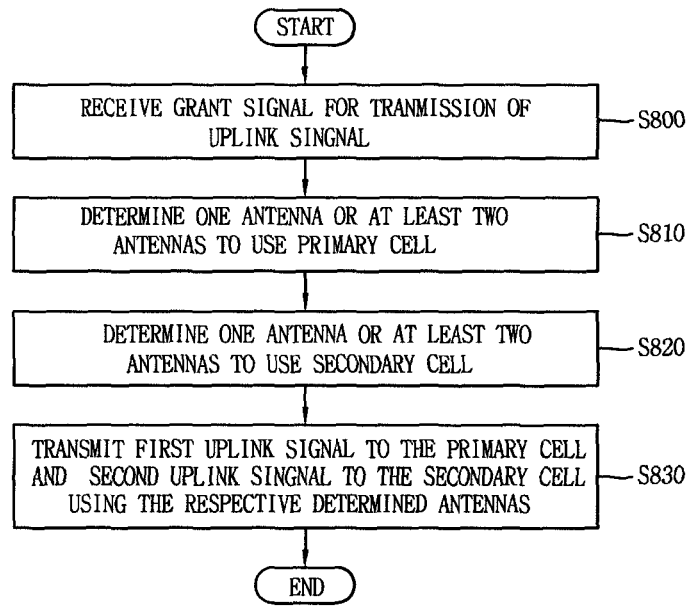
FIG. 8 is a flowchart illustrating a transmission method for uplink MIMO and carrier aggregation in accordance with one exemplary embodiment.

FIG. 8 is a flowchart illustrating a transmission method for uplink MIMO and carrier aggregation in accordance with one exemplary embodiment.

The transmission method for uplink MIMO and carrier aggregation may include receiving a grant signal for transmission of an uplink signal, the grant signal including information related to use of a primary cell and a secondary cell (S800), determining one antenna or at least two antennas to use the primary cell (S810), determining one antenna or at least two antennas to use the secondary cell (S820), and transmitting a first uplink signal to the primary cell and a second uplink signal to the secondary cell using the determined respective antennas (S830).

Figure 9:
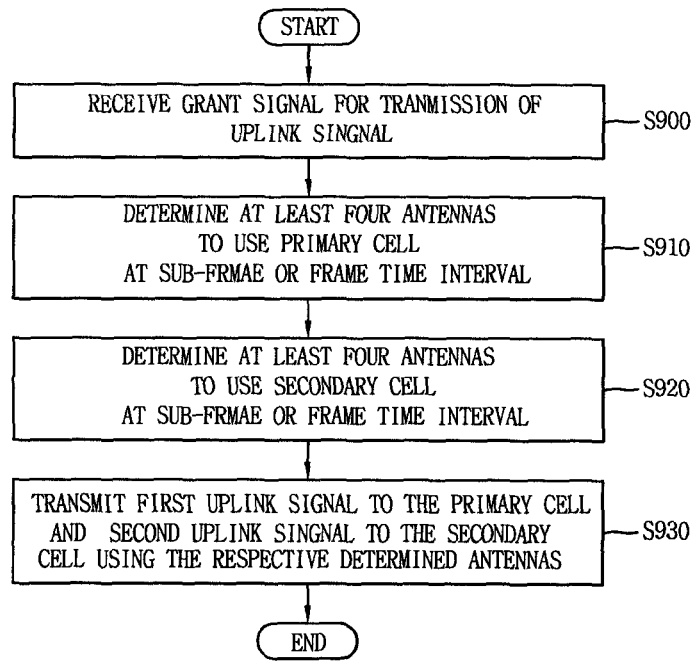
FIG. 9 is a flowchart illustrating a transmission method for uplink MIMO and carrier aggregation in accordance with another exemplary embodiment.

FIG. 9 is a flowchart illustrating a transmission method for uplink MIMO and carrier aggregation in accordance with another exemplary embodiment.

The transmission method for uplink MIMO and carrier aggregation may include receiving a grant signal for transmission of the uplink signal (S900), the grant signal including information related to use of a primary cell and a secondary cell, determining at least four antennas to use the primary cell at a frame or sub-frame time interval (S910), determining at least two antennas to use the secondary cell at a frame or subframe time interval (S920), and transmitting a first uplink signal to the primary cell and a second uplink signal to the secondary cell using the determined respective antennas (S930).

In accordance with one exemplary embodiment, the present disclosure provides a transmission method for uplink Multi-Input Multi-Output (MIMO) and Carrier Aggregation (CA), in a method for transmitting an uplink signal by CA in a terminal having at least four antennas. The method may include receiving a grant signal for transmission of an uplink signal, the grant signal including information related to use of a primary cell and a secondary cell, determining one antenna or at least two antennas to use the primary cell, determining one antenna or at least two antennas to use the secondary cell, and transmitting a first uplink signal to the primary cell and a second uplink signal to the secondary cell using the respective determined antennas, wherein the antenna to use the primary cell does not overlap the antenna to use the secondary cell, wherein when at least two antennas are to use the primary cell, the at least two antennas are not adjacent to each other, wherein when two antennas are to use the secondary cell, the at least two antennas are not adjacent to each other.

Here, the transmission of the first uplink signal to the primary cell and the second uplink signal to the secondary cell using the respective determined antennas may be an inter-band or intra-band transmission. The sub-frame or frame time interval may be in the range of 1 ms to 10 ms.

In accordance with another exemplary embodiment, the present disclosure provides a transmission method for uplink Multi-Input Multi-Output (MIMO) and Carrier Aggregation (CA), in a method for transmitting an uplink signal by CA in a terminal having at least four antennas. The method may include receiving a grant signal for transmission of the uplink signal, the grant signal including information related to use of a primary cell and a secondary cell, determining at least four antennas to use the primary cell at a frame or sub-frame time interval, determining at least two antennas to use the secondary cell at a frame or sub-frame time interval, and transmitting a first uplink signal to the primary cell and a second uplink signal to the secondary cell using the determined respective antennas, wherein a time to use the primary cell and a time to use the secondary cell do not overlap each other, wherein when at least two antennas are to use the secondary cell, the at least two antennas are not adjacent to each other.

Here, the transmission of the first uplink signal to the primary cell and the second uplink signal to the secondary cell using the respective determined antennas may be an inter-band or intra-band transmission. The sub-frame or frame time interval may be in the range of 1 ms to 10 ms.

In accordance with one exemplary embodiment, the present disclosure provides a transmission apparatus for uplink Multi-Input Multi-Output (MIMO) and Carrier Aggregation (CA), in an apparatus for transmitting an uplink signal by CA in a terminal having at least four antennas. The apparatus may include a receiver configured to receive a grant signal for transmission of the uplink signal, the grant signal including information related to use of a primary cell and a secondary cell, a controller configured to determine one antenna or at least two antennas to use the primary cell and determine one antenna or at least two antennas to use the secondary cell, and a transmitter configured to transmit a first uplink signal to the primary cell and a second uplink signal to the secondary cell using the respective determined antennas, wherein the controller determines the antenna to use the primary cell and the antenna to use the secondary cell in a non-overlapped state, wherein when at least two antennas are to use the primary cell, the at least two antennas are not adjacent to each other, wherein when two antennas are to use the secondary cell, the at least two antennas are not adjacent to each other.

In accordance with another exemplary embodiment, the present disclosure provides a transmission apparatus for uplink Multi-Input Multi-Output (MIMO) and Carrier Aggregation (CA), in an apparatus for transmitting an uplink signal by CA in a terminal having at least four antennas. The apparatus may include a receiver configured to receive a grant signal for transmission of the uplink signal, the grant signal including information related to use of a primary cell and a secondary cell, a controller configured to determine at least four antennas to use the primary cell at a frame or sub-frame time interval and determine at least two antennas to use the secondary cell at a frame or sub-frame time interval, and a transmitter configured to transmit a first uplink signal to the primary cell and a second uplink signal to the secondary cell using the determined respective antennas, wherein the controller determines the time to use the primary cell and the time to use the secondary cell in a non-overlapped state, wherein when two antennas are to use the secondary cell, the at least two antennas are not adjacent to each other.

Hereinafter, description will be given of a configuration and a function of a terminal (or UE) according to this specification.

The terminal described above may be referred to as a device, and include any terminal which is capable of implementing the exemplary embodiments illustrated in FIGS. 4 to 7. That is, the terminal described in this specification, namely, the device may comprehensively include mobile communication terminals (e.g., user equipment (UE), a mobile phone, a cellular phone, a DMB phone, a DVB-H phone, a PDA phone, a PTT phone and the like), digital TV, GPS navigator, portable game machine, MP3 and other home alliances.

Also, a terminal according to this specification may include software or a module having the software for implementing the exemplary embodiments of FIGS. 4 to 7. The module is one component and may be referred to as a processor or a controller. The terminal may include essential hardware and software components for executing the technical features of the present disclosure.

The method having described so far may be implemented by software, hardware or combination thereof. For example, the method may be stored in a storage medium (for example, an internal memory of a terminal, a flash memory, a hard disc, etc.), and implemented as codes or commands within a software program, which may be executed by a processor (for example, a microprocessor within the terminal).

The configurations and transmission method for the UL-MIMO and CA in the aforesaid embodiments may not be limitedly applied, but such embodiments may be configured by a selective combination of all or part of each embodiment so as to derive many variations.

The invention claimed is:

1. A transmission method for uplink Multi-Input Multi-Output (MIMO) and Carrier Aggregation (CA), in a method for transmitting an uplink signal by CA in a terminal having at least four antennas, the method comprising:
   receiving a grant signal for transmission of an uplink signal, the grant signal including information related to uplink antenna configuration for a primary cell and a secondary cell;
   determining one antenna or at least two antennas to use for the primary cell and the secondary cell using the uplink antenna configuration; and
   transmitting a first uplink signal on the primary cell and a second uplink signal on the secondary cell using the determined respective antennas,
   wherein the antennas for the primary cell do not overlap the antennas for the secondary cell,
   wherein when at least two antennas are used for the primary cell, the at least two antennas for the primary cell are not adjacent to each other, and
   wherein when at least two antennas are used for the secondary cell, the at least two antennas for the secondary cell are not adjacent to each other.

2. The method of claim 1, wherein the transmission of the first uplink signal on the primary cell and the second uplink signal on the secondary cell using the determined respective antennas are an inter-band or intraband transmission.

3. A transmission apparatus for uplink Multi-Input Multi-Output (MIMO) and Carrier Aggregation (CA), in an apparatus for transmitting an uplink signal by CA in a terminal having at least four antennas, the apparatus comprising:
- a receiver configured to receive a grant signal for transmission of the uplink signal, the grant signal including information related to uplink antenna configuration for a primary cell and a secondary cell;
- a controller configured to determine one antenna or at least two antennas to use for the primary cell and the secondary cell; and
- a transmitter configured to transmit a first uplink signal to the on the primary cell and a second uplink signal on the secondary cell using the determined respective antennas,
- wherein the controller determines the antennas to be used for the primary cell and the secondary cell in a non-overlapped state,
- wherein when at least two antennas are used for the primary cell, the at least two antennas for the primary cell are not adjacent to each other, and
- wherein when at least two antennas are used for the secondary cell, the at least two antennas for the secondary cell are not adjacent to each other.

4. The apparatus of claim 3, wherein the transmission of the first uplink signal to the primary cell and the second uplink signal to the secondary cell using the determined respective antennas are an inter-band or intraband transmission.

* * * * *